United States Patent [19]

Kitamoto

[11] Patent Number: 5,297,396
[45] Date of Patent: Mar. 29, 1994

[54] AIR CONDITIONING APPARATUS HAVING A PLURALITY OF INDOOR UNITS CONNECTED TO AN OUTDOOR UNIT

[75] Inventor: Manabu Kitamoto, Shizuoka, Japan

[73] Assignee: Kabushiki Kaisha Toshiba, Kawasaki, Japan

[21] Appl. No.: 83,695

[22] Filed: Jun. 30, 1993

[30] Foreign Application Priority Data

Jul. 10, 1992 [JP] Japan ................................ 4-184103

[51] Int. Cl.$^5$ ...................... G01K 17/06; F25B 1/00
[52] U.S. Cl. ..................................... 62/175; 62/228.1; 165/11.1; 374/39
[58] Field of Search ...................... 62/126, 228.3, 208, 62/228.1; 165/11.1; 374/39, 147

[56] References Cited

U.S. PATENT DOCUMENTS

| | | | |
|---|---|---|---|
| 4,036,051 | 7/1977 | Fell et al. ................... | 374/39 |
| 4,595,297 | 6/1986 | Liu et al. ................... | 374/43 X |
| 4,926,652 | 5/1990 | Kitamoto ................... | 62/175 |
| 4,932,220 | 6/1990 | Inoue ......................... | 62/175 |
| 5,074,120 | 12/1991 | Kitamoto ................... | 62/156 |

*Primary Examiner*—William E. Wayner
*Attorney, Agent, or Firm*—Cushman, Darby & Cushman

[57] ABSTRACT

A variable-capability compressor and an outdoor heat exchanger installed in an outdoor unit and indoor heat exchangers installed in each of a plurality of indoor units are connected by pipes so as to form a refrigerating cycle. The air-conditioning load on each of the indoor units is detected. The capability of the variable-capability compressor is controlled according to the sum of the air-conditioning loads on the respective indoor units. At the time of a heating operation, the refrigerant heat loss in each of pipes respectively connected to the indoor heat exchangers is detected. When the refrigerant heat loss in at least one of the pipes is a given value or more, the capability of the variable-capability compressor is enhanced to compensate for the refrigerant heat loss.

6 Claims, 4 Drawing Sheets

AIR CONDITIONING APPARATUS HAVING A PLURALITY OF INDOOR UNITS CONNECTED TO AN OUTDOOR UNIT

BACKGROUND OF THE INVENTION

1. Field of the Invention

The present invention relates to a multi-type air conditioning apparatus for air-conditioning a plurality of rooms.

2. Description of the Related Art

In buildings with many rooms, use is made of a multi-type air conditioning apparatus in which a plurality of indoor units are connected to a single outdoor unit.

This type of air conditioning apparatus is equipped with an variable-capability compressor and an outdoor heat exchanger in the outdoor unit, and an indoor heat exchanger in each of the indoor units, the variable-capability compressor, the outdoor heat exchanger and the indoor heat exchangers constituting a refrigerating cycle.

Each indoor unit is arranged to sense its air-conditioning load based on indoor temperature and inform the outdoor unit of the sensed air-conditioning load. The outdoor unit controls the capability of the variable-capability compressor in accordance with the sum of the air-conditioning loads on the indoor units.

Examples of this type of air conditioning system are disclosed in U.S. Pat. Nos. 4,926,652, 4,932,220, and 5,074,120.

With such an air-conditioning apparatus, the pipe coupled to each indoor heat exchanger is made large in bore diameter so as to allow a sufficient amount of refrigerant to flow through the indoor heat exchanger.

However, when the air-conditioning load is so light that the amount of refrigerant flowing through the indoor heat exchanger is small, the heat loss of the refrigerant in the pipe increases. Further, the longer the pipe is, the further the heat loss increases.

The heat loss is represented by the product of the actual amount of heat loss and the capability of the variable-capability compressor. When the heat loss is great, the indoor unit becomes poor in air-conditioning capability, particularly in heating capability.

SUMMARY OF THE INVENTION

It is therefore an object of the present invention to provide a multi-type air conditioning apparatus which permits each of indoor units to provide a required heating capability without being affected by the bore diameter and the length of the pipe coupled to the corresponding indoor heat exchanger.

According to the present invention there is provided an air-conditioning apparatus in which a plurality of indoor units are connected to an outdoor unit, comprising:

a variable-capability compressor, installed in said outdoor unit, for sucking, compressing and discharging a refrigerant;

an outdoor heat exchanger installed in said outdoor unit;

a plurality of indoor heat exchangers respectively installed in said indoor units;

a refrigerating cycle constituted by connecting said variable-capability compressor, said outdoor heat exchanger and said indoor heat exchangers by means of pipes;

first detecting means, installed in each of said indoor units, for detecting an air-conditioning load on the corresponding indoor unit;

first control means for controlling the capability of said variable-capability compressor according to the sum of air-conditioning loads on said indoor units detected by said first detecting means;

means for, in said refrigerating cycle, allowing the refrigerant discharged from said variable-capability compressor to flow through said indoor heat exchangers and then said outdoor heat exchanger and to return to said variable-capability compressor, thereby carrying out a heating operation;

second detecting means for, at the time of said heating operation, detecting the refrigerant heat loss in each of pipes respectively connected to said indoor heat exchangers; and second control means for, when the detected refrigerant heat loss in at least on of said pipes is a given value or more, enhancing the capability of said variable-capability compressor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Hereinafter a description will be made of a first embodiment of the present invention with reference to the drawings.

Figure 1:
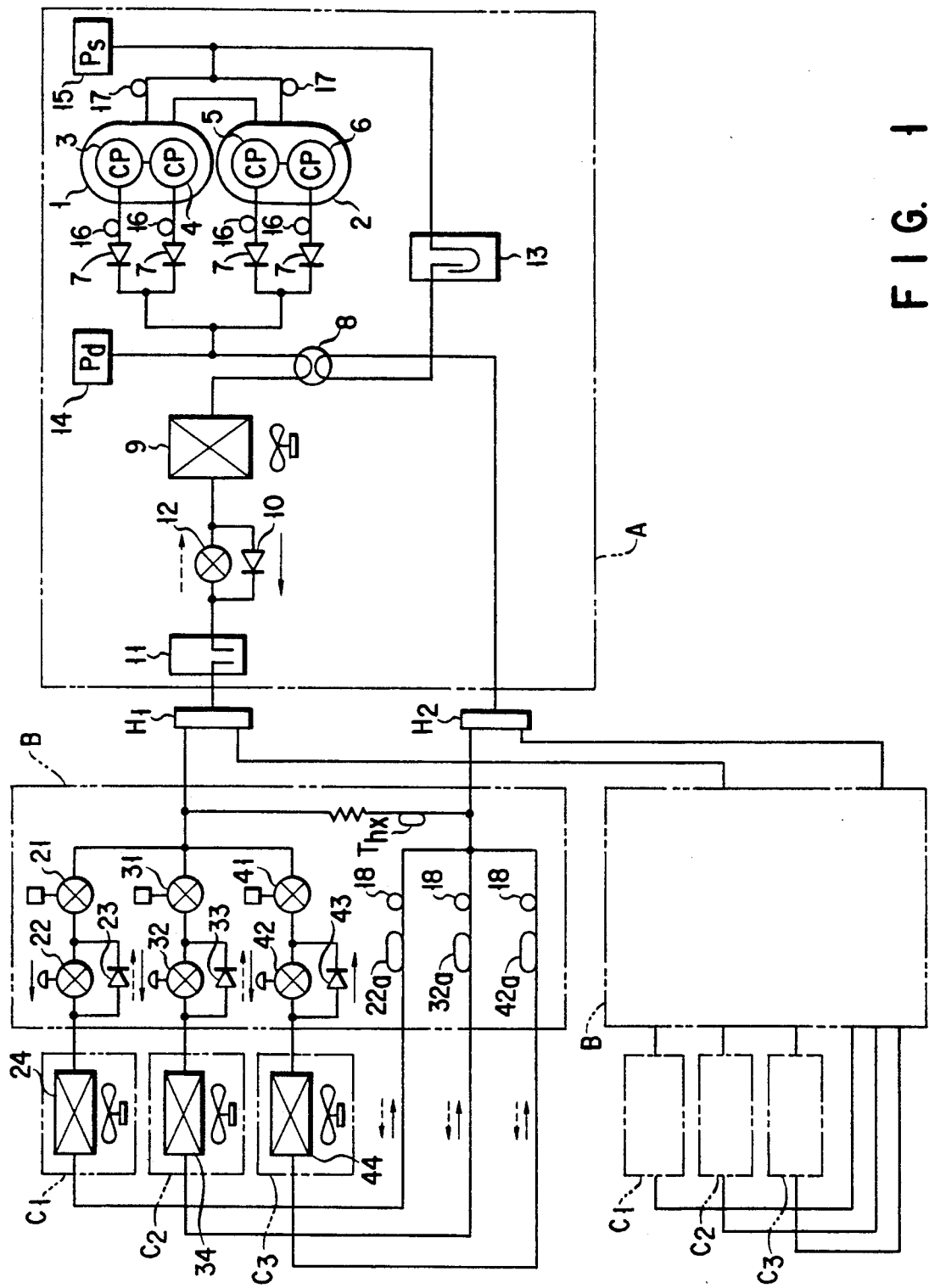
FIG. 1 shows an arrangement of a refrigerating cycle according to a first embodiment of the present invention.

In FIG. 1, A denotes an outdoor unit to which a plurality of indoor units $C_1$, $C_2$, and $C_3$ are coupled through a distribution unit B.

The outdoor unit A is equipped with an inverter-driven variable-capability compressor 3, a commercial-power-source-driven fixed-capability compressor 4, an inverter-driven variable-capability compressor 5, and a commercial-power-source-driven fixed-capability compressor 6.

The compressors 3, 4, 5 and 6 sucks and compresses a refrigerant from respective suction ports and discharges it from respective discharge ports.

The variable-capability compressor 3 and the fixed-capability compressor 4 are housed in a common casing 1. The variable-capability compressor 5 and the fixed-capability compressor 6 are housed in a common casing 2.

The compressors 3, 4, 5, and 6 have their discharge ports coupled to an outdoor heat exchanger 9 through respective check valves 7 and a four-way valve 8. The outdoor heat exchanger 9 exchanges heat between the incoming refrigerant and the outdoor air.

To the outdoor heat exchanger 9 is coupled a header $H_1$ through a check valve 10 and a liquid receiver 11. An expansion valve 12 for heating operations is connected in parallel with the check valve 10.

The header $H_1$ is coupled to indoor heat exchangers 24, 34 and 44 in the respective indoor units $C_1$, $C_2$ and $C_3$ through respective motor-driven flow control valves 21, 31 and 41 and respective expansion valves 22, 32 and 42 for cooling operations.

As each of the flow control valves 21, 31 and 41 use is made of a pulse motor valve whose opening continuously varies with the number of incoming drive pulses. Hereinafter, the flow control valve is abbreviated to PMV.

The indoor heat exchangers 22, 32 and 42 exchange heat between the incoming refrigerant and the indoor air.

Check valves 23, 33 and 43 are connected in parallel with the expansion valves 22, 32 and 42, respectively.

A header $H_2$ is connected to the indoor heat exchangers 24, 34 and 44. The header $H_2$ is connected to the suction ports of the compressors 3, 4, 5, and 6 via the four-way valve 8 and an accumulator 13.

This laying pipes of connections permits the outdoor unit A, the distribution unit B and the indoor units $C_1$, $C_2$ and $C_3$ to constitute a heat pump type refrigerating cycle.

The expansion valves 22, 32, and 42 are provided with heat-sensitive cylinders 22a, 32a, and 42a, respectively. The heat-sensitive cylinders 22a, 32a and 42a are attached to the gas-side pipes that respectively connect the indoor heat exchangers 24, 34 and 44 to the header $H_2$.

Each of the expansion valves 22, 32 and 42 automatically controls its opening so that a difference between the temperature of the incoming refrigerant and the temperature sensed by the corresponding heat-sensitive cylinder may remain constant. The temperature difference represents the degree of superheat.

To the pipe connected between the check valves 7 and the four-way valve 8 is attached a pressure sensor 14 which senses the pressure Pd (the high-pressure-side pressure) of the refrigerant discharged out of the compressors 3, 4, 5 and 6.

To the pipe connected to the suction ports of the compressors 3, 4, 5 and 6 is attached a pressure sensor 15 which senses the pressure Ps (the low-pressure-side pressure) of the refrigerant suck into the compressors 3, 4, 5 and 6.

First temperature sensors 16 are respectively attached to the pipes which are respectively connected to the discharge ports of the compressors 3, 4, 5 and 6. Each of the temperature sensors 16 senses the temperature Td of the refrigerant discharged out of the corresponding compressor.

Temperature sensors 17 are respectively attached to the pipe connected to the suction ports of the compressors 3 and 4 and the pipe connected to the suction ports of the compressors 5 and 6. Each of these temperature sensors 17 senses the temperature Ts of the refrigerant suck into the corresponding pair of compressors.

Second temperature sensors 18 are respectively attached to the gas-side pipes to which the heat-sensitive cylinders 22a, 32a and 42a are attached. Each of the temperature sensors 18 senses the temperature Ti of the refrigerant flowing into the corresponding indoor heat exchanger at the time of a heating operation.

Figure 2:
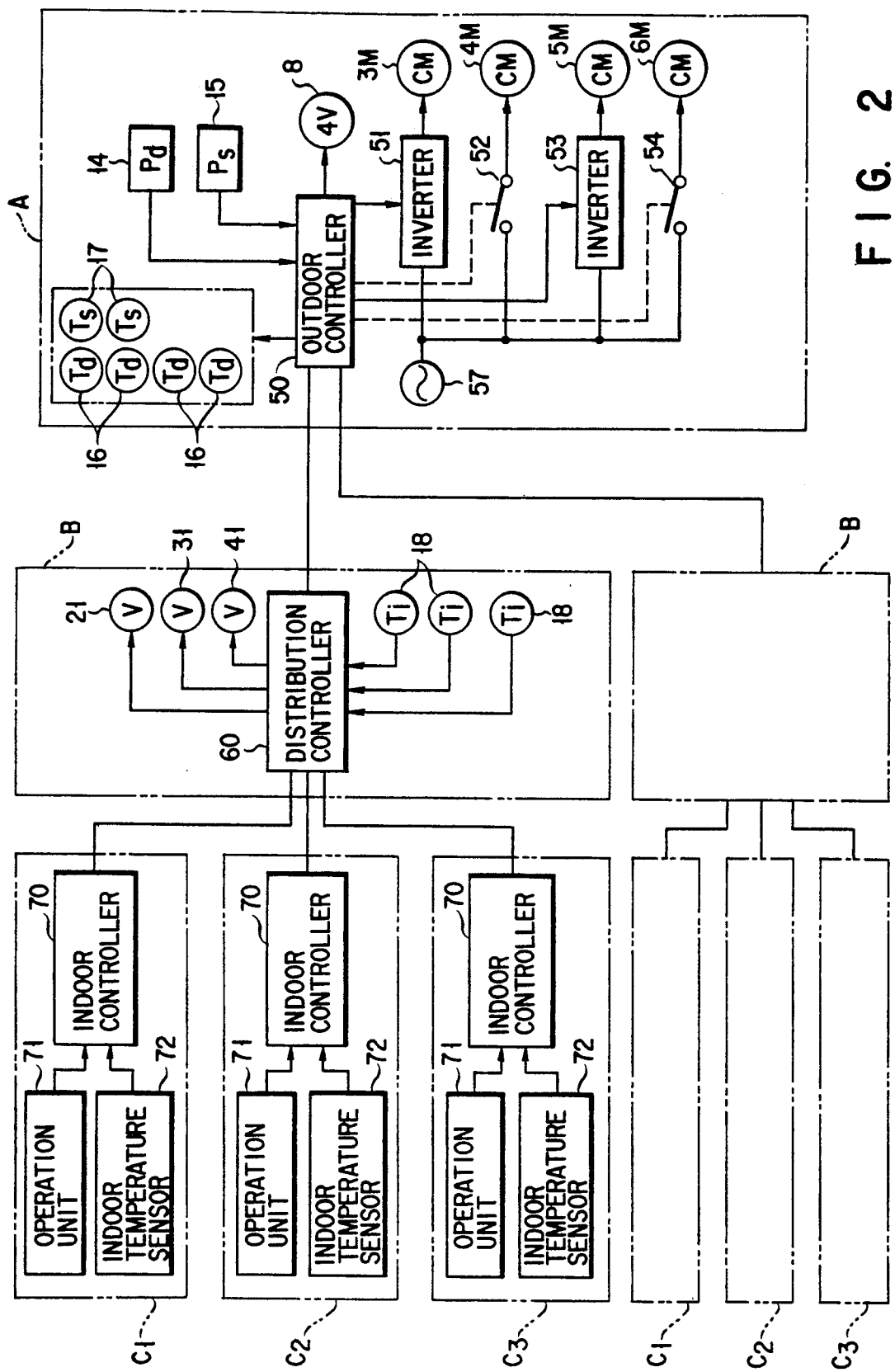
FIG. 2 is a block diagram of the control circuits of the first embodiment.

A control circuit is illustrated in FIG. 2.

The indoor unit A is provided with an outdoor controller 50. The outdoor controller 50 is connected to a distribution controller 60 of the distribution unit B, which is in turn connected to an indoor controller 70 of each of the indoor units $C_1$, $C_2$ and $C_3$.

The outdoor controller 50 is composed of a microcomputer and its associated peripheral circuits. To the outdoor controller 50 are connected the four-way valve 8, the pressure sensors 14 and 15, the temperature sensors 16, the temperature sensors 17, inverters 51 and 53, and switches 52 and 54.

The inverter 51 rectifies a voltage from a commercial ac power source 57 and converts it to an output voltage of a given frequency $F_1$ corresponding to a command from the outdoor controller 50. The output voltage of the inverter 51 is applied to a motor 3M of the compressor 3 to drive it. The inverter 53 rectifies a voltage from the commercial ac power source 57 and converts it to an output voltage of a given frequency $F_2$ corresponding to a command from the outdoor controller 50. The output voltage of the inverter 51 is applied to a motor 5M of the compressor 5 to drive it.

The switches 52 and 54 are relay contacts by way of example. The switch 52 is connected between the commercial ac power source 57 and a motor 4M of the compressors 4 and 6, while the switch 54 is connected between the ac power source 57 and a motor 6M of the compressor 6. That is, the switches 52 and 54 each control the supply of power supply voltage to the respective individual motors 4M and 6M.

The distribution controller 60 is constructed from a microcomputer and its associated peripheral circuits. To the distribution controller 60 are connected the PMVs 21, 31 and 41, and the temperature sensors 18.

The indoor controller 70 comprises a microcomputer and its associated peripheral circuits. To the outdoor controller 70 are connected a remote control operation unit 71 and an indoor temperature sensor 72.

The indoor controller 70 is provided with the following function means [1] through [3].

[1] Means for transmitting to the distribution unit B an operation starting command, an operation mode command, an operation stopping command and so on which are based on operations of the operation unit 71.

[2] Means for detecting a difference between a temperature sensed by the indoor temperature sensor 72 and an indoor temperature preset by the operation unit 71 as an air-conditioning load.

[3] Means for informing the distribution unit B of the detected air-conditioning load.

The distribution controller 60 has the following function means [1] through [4].

[1] Means for obtaining the sum of the air-conditioning loads on the indoor units $C_1$, $C_2$ and $C_3$.

[2] Means for informing the outdoor unit A of the sum of the air-conditioning loads obtained.

[3] Means for controlling the respective openings of the PMVs 21, 31 and 41 according to the respective air-conditioning loads on the indoor units $C_1$, $C_2$ and $C_3$.

[4] Means for informing the outdoor unit A of the temperature Ti sensed by each of the temperature sensors 18.

The outdoor controller 50 has the following function means [1] through [5].

[1] Means for, by placing the four-way valve 8 in the neutral state, allowing the refrigerant discharged from the compressors 3, 4, 5 and 6 to flow through the outdoor heat exchanger 9 and then the indoor heat exchangers 24, 34 and 44 as indicated by solid arrows in FIG. 1 and to return to the compressors 3, 4, 5 and 6, thereby carrying out a cooling operation.

[2] Means for, by switching the four-way valve 8, allowing the refrigerant discharged from the compressors 3, 4, 5 and 6 to flow through the indoor heat exchangers 24, 34 and 44 and then the outdoor heat exchanger 9 as indicated by broken arrows in FIG. 1 and to return to the compressors 3, 4, 5 and 6, thereby carrying out a heating operation.

[3] Means for controlling the number of the compressors 3, 4, 5 and 6 to be operated and the operating frequencies of the compressors 3 and 5 (i.e., the output frequencies $F_1$ and $F_2$ of the inverters 51 and 53) in accordance with the sum of the air-conditioning loads.

[4] Means for, at the time of a heating operation, detecting the heat loss of the refrigerant in each of the pipes respectively connected to the indoor heat exchangers 24, 34 and 44.

[5] Means for, when at least one of the heat losses detected is a given value or more, increasing the operating frequency $F_1$ of the compressor 3 (i.e., the output frequency of the inverter 51) in $\Delta F$ steps with the set value Fx taken as the upper limit as long as the temperature Td sensed by each temperature sensor 16 is below the allowable highest value $Td_1$ and the temperature Ts sensed by each temperature sensor 17 is above the allowable lowest value $Ts_1$.

Note that the detecting means in [4] is constructed from the first temperature sensors 16 for sensing the temperatures Td of the respective refrigerants discharged from the respective compressors 3, 4, 5 and 6, the second temperature sensors 18 for sensing the temperatures Ti of the respective refrigerants flowing into the respective indoor heat exchangers 24, 34 and 44, means for detecting a difference $\Delta T$ between the highest one of the temperatures Td sensed by the first temperature sensors and the temperature Ti sensed by each second temperature sensor, and means for detecting the refrigerant heat losses in the respective pipes connected to the indoor heat exchangers 24, 34 and 44 on the basis of the detected temperature differences $\Delta T$.

Figure 3:
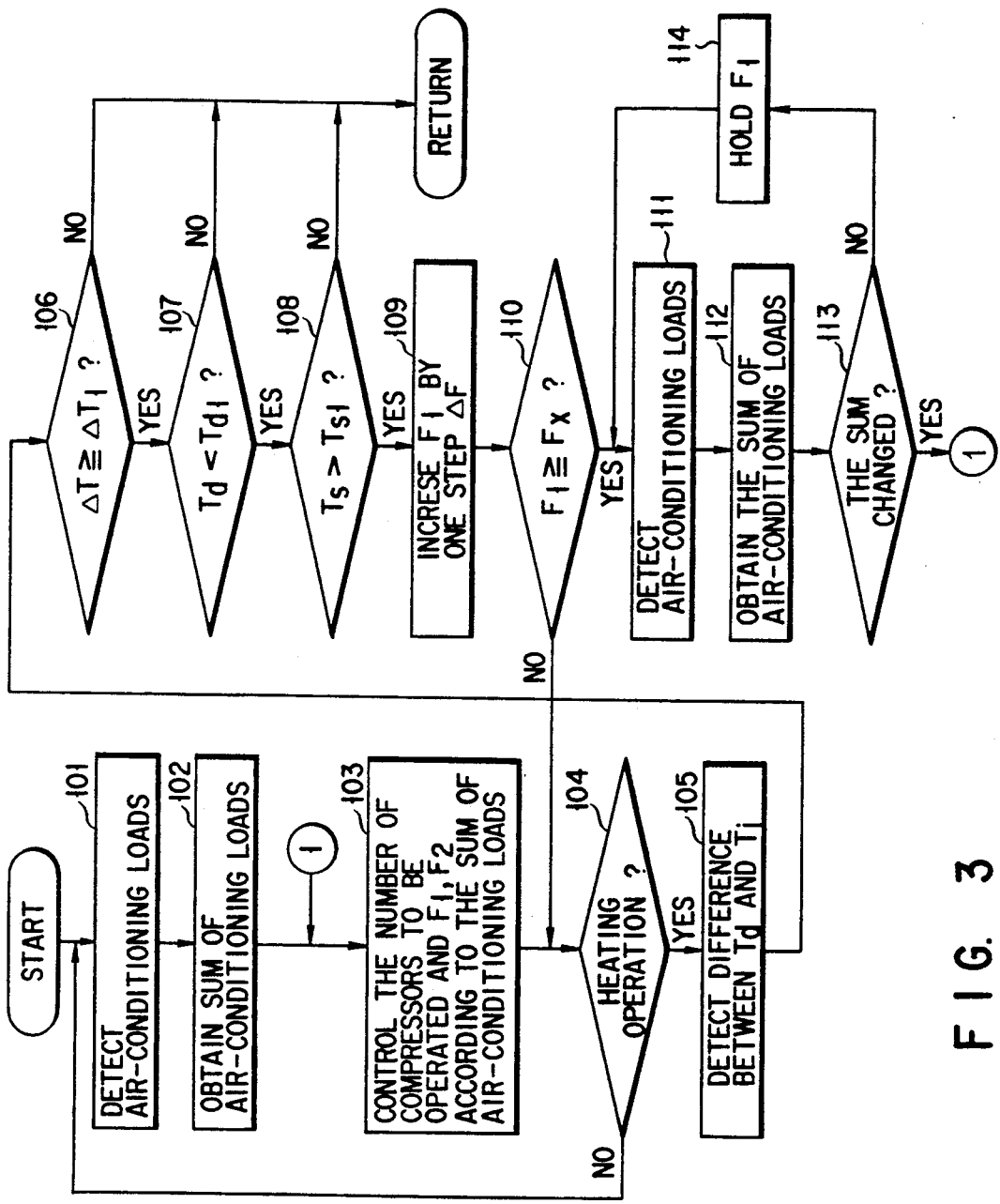
FIG. 3 is a flowchart for use in explanation of the operation of the first embodiment.

Hereinafter, the operation of the above-described arrangement will be described with reference to a flowchart illustrated in FIG. 3.

At the time of a cooling operation, the four-way valve 8 is placed in the neutral position, so that the refrigerant discharged from the compressors 3, 4, 5 and 6 flows in the direction indicated by solid arrows of FIG. 1. That is, the refrigerant discharged from the compressors 3, 4, 5 and 6 is allowed to flow through the outdoor heat exchanger 9 and then the indoor heat exchangers 24, 34 and 44 and to return to the compressors 3, 4, 5 and 6. This flow of the refrigerant permits the outdoor heat exchanger 9 to serve as condensers and the indoor heat exchangers 24, 34 and 44 to serve as an evaporator, thus cooling the air in the rooms.

At the time of a heating operation, the four-way valve 8 is switched, so that the refrigerant discharged from the compressors 3, 4, 5 and 6 flows in the direction indicated by broken arrows of FIG. 1. That is, the refrigerant discharged from the compressors 3, 4, 5 and 6 is arrowed to flow through the indoor heat exchangers 24, 34, 44 and then the outdoor heat exchanger 9 and to return to the compressors 3, 4, 5 and 6. This flow of the refrigerant permits the indoor heat exchangers 24, 34 and 44 to serve as condensers and the outdoor heat exchanger 9 to serve as evaporator, thus heating the air in the rooms.

During an operation, the air-conditioning loads are respectively obtained in the indoor units $C_1$, $C_2$ and $C_3$ (step 101), and then the sum of the air-conditioning loads is obtained (step 102). Subsequently, the number of compressors to be operated and the operating frequencies $F_1$ and $F_2$ of the compressors 3 and 5 are controlled according to the sum of the air-conditioning loads (step 103).

That is, when the sum of the air-conditioning loads is small, only the compressor 3 is operated singly, and the operating frequency $F_1$ is controlled to change the capability of the compressor 3. When the sum of the air-conditioning loads increases a little, the two compressors 3 and 5 are operated, and the operating frequencies $F_1$ and $F_2$ are controlled to change the capabilities of the compressors 3 and 5. When the sum of the air-conditioning loads further increases, the three compressors 3 and 5 are operated, and the operating frequencies $F_1$ and $F_2$ are controlled to change the capabilities of the compressors 3 and 5. When the sum of the air-conditioning loads further increases, the four compressors 3, 4, 5 and 6 are operated, and the operating frequencies $F_1$ and $F_2$ are controlled to change the capabilities of the compressors 3 and 5.

In addition, the openings of the PMVs 21, 31 and 41 are controlled according to the respective air-conditioning loads of the indoor units $C_1$, $C_2$ and $C_3$ which have been detected in step 101. This permits those amounts of refrigerant which correspond to the respective air-conditioning loads to flow into the indoor units $C_1$, $C_2$ and $C_3$.

On the other hand, the temperature Td of the refrigerant discharged from each of the compressors 3, 4, 5 and 6 is sensed by the corresponding temperature sensor 16. The temperature Ts of the refrigerant sucking into each of the compressors 3, 4, 5 and 6 is sensed by the corresponding temperature sensor 17.

When a heating operation is performed (YES in step 104), the temperature Ti of the refrigerant flowing into each of the indoor heat exchangers 24, 34 and 44 serving as condensers is sensed by the corresponding temperature sensor 18. Subsequently, a difference between the highest value of the refrigerant temperatures Td sensed by the temperature sensors 16 and a refrigerant temperature sensed by each of the temperature sensors 18, i.e., $\Delta T = Td - Ti$, is detected.

The pipes connected to the indoor heat exchangers 24, 34 and 44 are each made large in bore diameter so that a sufficient amount of refrigerant ma flow through each of them. However, since the pipe is large in bore diameter, if the flow rate of the refrigerant is small, then the refrigerant heat loss in the pipe will increase. Furthermore, the longer the pipe is, the greater the heat loss becomes.

For example, suppose that the refrigerant heat loss in the pipe connecting the indoor unit $C_1$ and the header $H_2$ is great. Then, the temperature of the refrigerant flowing into the indoor heat exchanger 24 in the indoor unit $C_I$ declines and one of the detected temperature differences $\Delta T$ becomes a preset value $\Delta T_1$ or above.

When at least one of the sensed temperature differences $\Delta T$ becomes the set value $\Delta T_1$ or more (YES in step 106), in other words, when at least one of the refrigerant heat losses in the pipes connected to the indoor heat exchangers 24, 34 and 44 becomes a predetermined value or more, the operating frequency $F_1$ (the output frequency of the inverter 51) is increased in $\Delta F$ steps (step 109) as long as the temperature Td sensed by each temperature sensor 17 is lower than the allowable highest value $Td_1$ (YES in step 107) and the temperature Ts sensed by each temperature sensor 17 is higher than the allowable lowest value $Ts_1$ (YES in step 108).

When all the temperature differences $\Delta T$ fall below the preset value $\Delta T_1$ (NO in step 106), in other words, when all the refrigerant heat losses in the pipes connected to the indoor heat exchangers 24, 34 and 44 fall below the given value, return is made to the normal capability control starting with step 101.

When the temperature difference $\Delta T$ does not fall below the preset value $\Delta T_1$ (YES in step 106), the operating frequency $F_1$ continues to be increased and eventually reaches the preset value Fx (YES in step 110). At this point, a decision is made as to whether a change has been made in the sum of air-conditioning loads (steps 111, 112 and 113).

When no change has been made in the sum of air-conditioning loads (YES in step 113), the operating frequency $F_1$ is held at the preset value Fx (step 114). When the sum of air-conditioning loads has been changed (YES in step 113), return is made to the normal capability control starting with step 103.

By, as described above, detecting the refrigerant heat loss in each of the pipes connected to the indoor heat exchangers 24, 34 and 44 and enhancing the capability of the compressor 3 to compensate for the heat loss when it is great, the indoor units $C_1$, $C_2$ and $C_3$ can provide a sufficient heating capability without being affected by the bore diameter and the length of the pipes connected to the indoor heat exchangers 24, 34 and 44.

Next, a second embodiment of the present invention will be described. The second embodiment is identical with the first embodiment in refrigeration cycle and control circuit but differs in function means for detecting the refrigerant heat loss.

That is, the refrigerant heat loss detecting means is constructed from the pressure sensor 14 for sensing the pressure Pd of the refrigerant discharged from the compressors 3, 4, 5 and 6 and means responsive to the sensed pressure Pd for detecting refrigerant heat loss in each of the pipes connected to the indoor heat exchangers 24, 34 and 44.

Figure 4:
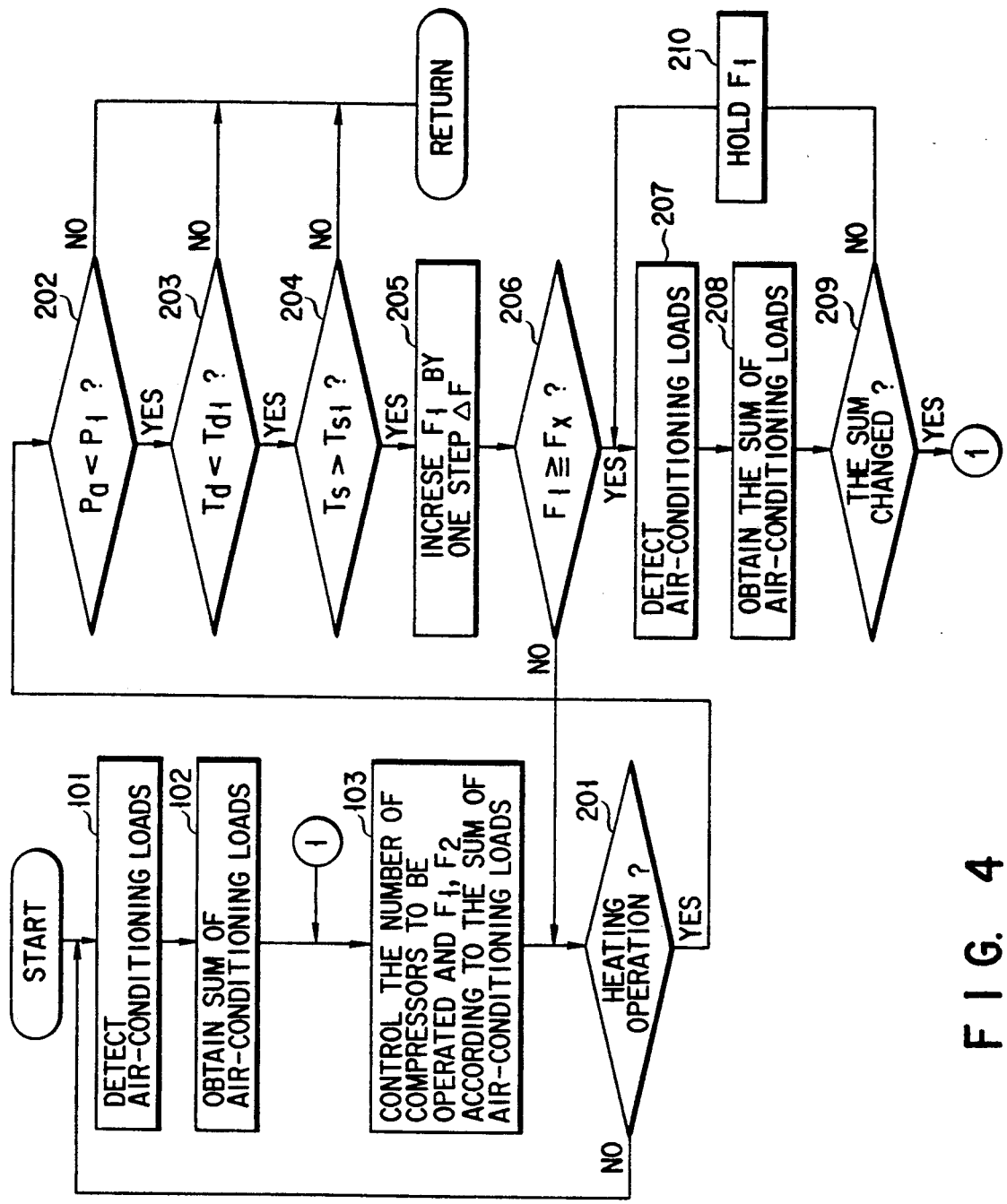
FIG. 4 is a flowchart for use in explanation of the operation of a second embodiment of the present invention.

The operation of the second embodiment will be described with reference to a flowchart illustrated in FIG. 4.

The process flow from step 101 to step 103 is the same as that in the first embodiment.

When a heating operation is performed (YES in step 201), a comparison is made between the high-pressure-side pressure Pd sensed by the pressure sensor 14 and a preset value $P_1$ (step 202).

Suppose that the sensed pressure Pd is lower than the preset value $P_1$. Then, the amount of the refrigerant flowing into each of the indoor heating exchangers 24, 34 and 44 decreases, resulting in increased refrigerant heat loss in each of the pipes connected to the indoor heating exchangers 24, 34 and 44.

When the pressure Pd sensed by the pressure sensor 14 falls below the preset value $P_1$ (YES in step 202), it is judged that the refrigerant heat loss in at least one of the pipes connected to the indoor heating exchangers 24, 34 and 44 should have exceeded a given value. Under this judgment, the operating frequency $F_1$ of the compressor 3 (i.e., the output frequency of the inverter 51) is increased in $\Delta F$ steps (step 205) as long as the temperature Td sensed by each temperature sensor 16 is below the allowable highest value $Td_1$ (YES in step 203) and the temperature Ts sensed by each temperature sensor 17 is above the allowable lowest value $Ts_1$ (YES in step 204).

When the pressure Pd sensed by the pressure sensor 14 increases to the set value $P_1$ or above (NO in step 202), it is judged that the refrigerant heat loss in each of the pipes connected to the indoor heat exchangers 24, 34 and 44 should have fallen to the given value or below. Under this judgment, return is made to the normal capability control starting with step 101.

As long as the pressure Pd sensed by the pressure sensor 14 is lower than the preset value $P_1$ (YES in step 202), the operating frequency $F_1$ continues to be increased and eventually reaches the preset value Fx (YES in step 206). Subsequently, a decision is made as to whether or not a change has been in the sum of the air-conditioning loads (steps 207, 208 and 209).

When no change has been made in the sum of the air-conditioning loads (YES in step 209), the operating frequency $F_1$ is held at the preset value Fx (step 210). When a change has been made in the sum of the air-conditioning loads (YES in step 209), on the other hand, return is made to the normal capability control starting with step 103.

By, as described above, detecting the refrigerant heat loss in each of the pipes connected to the indoor heat exchangers 24, 34 and 44 and enhancing the capability of the compressor 3 to compensate for the heat loss when it is great, the indoor units $C_1$, $C_2$ and $C_3$ can provide a sufficient heating capability without being affected by the bore diameter and the length of the pipes connected to the indoor heat exchangers 24, 34 and 44.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An air-conditioning apparatus in which a plurality of indoor units are connected to an outdoor unit, comprising:

a variable-capability compressor, installed in said outdoor unit, for sucking, compressing and discharging a refrigerant;

an outdoor heat exchanger installed in said outdoor unit;

a plurality of indoor heat exchangers respectively installed in said indoor units;

a refrigerating cycle constituted by connecting said variable-capability compressor, said outdoor heat exchanger and said indoor heat exchangers by means pipes;

first detecting means, installed in each of said indoor units, for detecting an air-conditioning load on the corresponding indoor unit;

first control means for controlling the capability of said variable-capability compressor according to the sum of air-conditioning loads on said indoor units detected by said first detecting means;

means for, in said refrigerating cycle, allowing the refrigerant discharged from said variable-capability compressor to flow through said indoor heat exchangers and then said outdoor heat exchanger and to return to said variable-capability compressor, thereby carrying out a heating operation;

second detecting means for, at the time of said heating operation, detecting the refrigerant heat loss in each of pipes respectively connected to said indoor heat exchangers; and second control means for, when the detected refrigerant heat loss in at least one of said pipes is a given value or more, enhancing the capability of said variable-capability compressor.

2. An apparatus according to claim 1, wherein said second detecting means comprises:

a first temperature sensor for sensing the temperature of the refrigerant discharged from said variable-capability compressor;

a plurality of second temperature sensors each of which senses the temperature of the refrigerant flowing into a respective one of said indoor heat exchangers;

means for detecting a difference between the temperature sensed by said first temperature sensor and the temperature sensed by each of said second temperature sensors; and means for detecting the refrigerant heat loss in each of said pipes connected to said indoor heat exchangers on the basis of the corresponding temperature difference detected by said difference detecting means.

3. An apparatus according to claim 1, wherein said second detecting means comprises:

a pressure sensor for sensing the pressure of the refrigerant discharged from said variable-capability compressor; and means for detecting the refrigerant heat loss in each of said pipes connected to said indoor heat exchangers on the basis of the pressure detected by said pressure sensor.

4. An apparatus according to claim 1, wherein said second control means, when the refrigerant heat loss in at least one of said pipes is detected to be a given value or more, enhances the capability of said variable-capability compressor in steps of a given value until that heat loss falls below said given value.

5. An apparatus according to claim 1, further comprising a fixed-capability compressor, installed in said outdoor unit, for sucking, compressing and discharging the refrigerant.

6. An apparatus according to claim 5, wherein said first control means controls the number of said variable-capability and fixed-capability compressors to be driven and the capability of said variable-capability compressor according to the sum of the air-conditioning loads detected by said first detecting means.

* * * * *